(12) United States Patent
El-Gawady et al.

(10) Patent No.: US 12,305,731 B2
(45) Date of Patent: May 20, 2025

(54) ENERGY DISSIPATION USING NEGATIVE STIFFNESS SHELLS

(71) Applicant: The Curators of the University of Missouri, Columbia, MO (US)

(72) Inventors: Mohamed El-Gawady, Rolla, MO (US); Yasser Darwish, Rolla, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 589 days.

(21) Appl. No.: 17/261,840

(22) PCT Filed: Sep. 18, 2019

(86) PCT No.: PCT/US2019/051738
§ 371 (c)(1),
(2) Date: Jan. 20, 2021

(87) PCT Pub. No.: WO2020/061196
PCT Pub. Date: Mar. 26, 2020

(65) Prior Publication Data
US 2021/0293295 A1    Sep. 23, 2021

Related U.S. Application Data

(60) Provisional application No. 62/734,074, filed on Sep. 20, 2018.

(51) Int. Cl.
*F16F 3/087*    (2006.01)
*F16F 1/373*    (2006.01)

(52) U.S. Cl.
CPC ............ *F16F 3/0876* (2013.01); *F16F 1/373* (2013.01); *F16F 2228/063* (2013.01); *F16F 2230/32* (2013.01)

(58) Field of Classification Search
CPC .......... F16F 1/373; F16F 1/445; F16F 3/0876; F16F 2228/063; F16F 2230/32
See application file for complete search history.

(56) References Cited

U.S. PATENT DOCUMENTS 3,831,920 A * 8/1974 Meldrum ............. F16F 3/0876
                                                  267/293
3,994,020 A * 11/1976 Villari .................... A42B 3/122
                                                    2/909

(Continued)

FOREIGN PATENT DOCUMENTS

CN         101055058 A     10/2007

OTHER PUBLICATIONS

EP 3530561 A1 (Year: 2019).*

(Continued)

*Primary Examiner* — Robert A. Siconolfi
*Assistant Examiner* — Mahbubur Rashid
(74) *Attorney, Agent, or Firm* — Stinson LLP

(57) ABSTRACT

A negative stiffness shell has a convex first position, but can transition or snap to a concave second position under a force applied to the exterior surface of the shell in the convex first position. During the transition, the shell exhibits negative stiffness that permits a large amount of energy to be absorbed. The negative stiffness shell can withstand a high initial force threshold prior to transitioning. In the second, concave position the shell can still resist force. Moreover, it is possible for the shell to revert back to the first, convex position with minimal plastic deformation for subsequent use. The negative stiffness shells can be used collectively and/or in layers to increase the efficiency of the overall negative stiffness shell unit.

15 Claims, 20 Drawing Sheets

(56) References Cited

U.S. PATENT DOCUMENTS

| | | | | |
|---|---|---|---|---|
| 4,535,553 | A | * | 8/1985 | Derderian ............ A43B 13/181 36/28 |
| 4,724,549 | A | * | 2/1988 | Herder ................... A42B 3/065 2/421 |
| 5,310,157 | A | | 5/1994 | Platus |
| 6,953,187 | B2 | * | 10/2005 | Groth .................... F16F 1/3935 267/141.1 |
| 7,625,023 | B2 | * | 12/2009 | Audi ....................... B60N 2/70 293/134 |
| 7,625,036 | B2 | * | 12/2009 | Cormier .................. B60R 19/18 296/187.03 |
| 8,118,289 | B2 | * | 2/2012 | Aveni .................... A43B 13/183 36/35 R |
| 8,950,735 | B2 | * | 2/2015 | Reynolds ................ F16F 1/376 267/64.11 |
| 10,010,122 | B2 | * | 7/2018 | Kamradt ............... A41D 31/285 |
| 10,030,733 | B2 | * | 7/2018 | Seepersad ............. F16F 1/3737 |
| 2005/0230205 | A1 | * | 10/2005 | Springler ................ F16F 7/121 188/377 |
| 2007/0228745 | A1 | | 10/2007 | Cormier et al. |
| 2010/0295221 | A1 | * | 11/2010 | Kligerman ............ F16F 3/0876 267/140.11 |
| 2011/0296594 | A1 | | 12/2011 | Thomas et al. |
| 2012/0174500 | A1 | | 7/2012 | Yakoub |
| 2012/0228309 | A1 | * | 9/2012 | Lukyanets ................ F17C 1/16 220/592 |
| 2013/0152284 | A1 | * | 6/2013 | Ferrara .................. F16F 9/0418 2/455 |
| 2014/0215722 | A1 | * | 8/2014 | Lobry ....................... F16F 1/37 267/142 |

OTHER PUBLICATIONS

RU 2172876 C2 (Year: 2001).*

Kashdan et al., Design, Fabrication and Evaluation of Negative Stiffness Elements, University of Texas at Austin (admitted prior art).

Unknown, New Honeycomb-Inspired Design Delivers Superior Protection from Impact, Jun. 15, 2015, 4 pages, engr.utexas.edu/news/archive/7970-nshoneycomb, Cockrell School of Engineering, University of Texas at Austin.

International Search Report and Written Opinion for PCT/US19/51738, Dec. 5, 2019, 14 pages.

Correa, et al., Negative Stiffness Honeycombs for Recoverable Shock Isolation, University of Texas at Austin, Mar. 16, 2015, 12 pages.

* cited by examiner

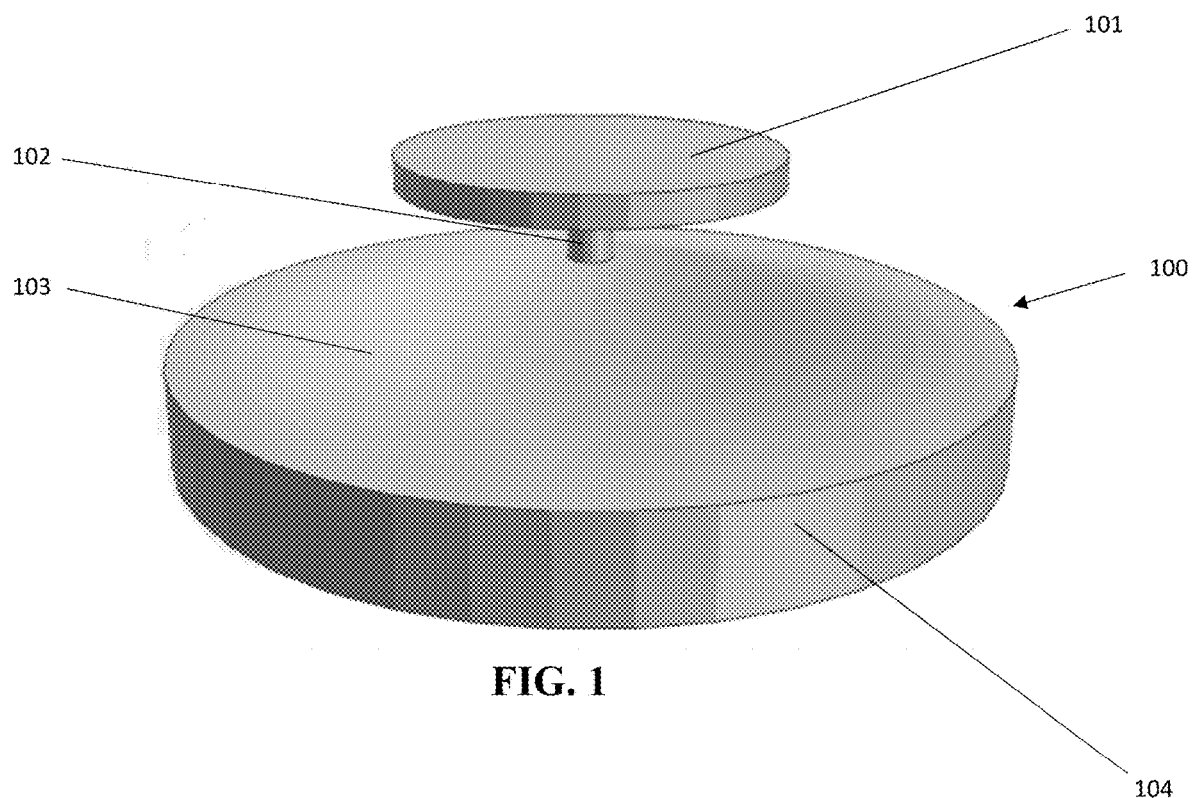
FIG. 1
FIG. 2(a)
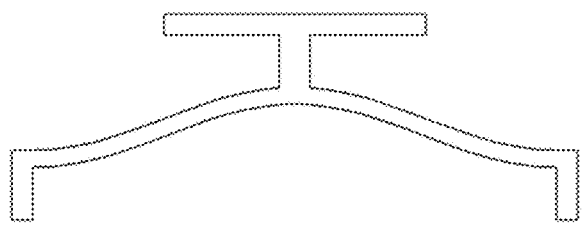
FIG. 2(b)
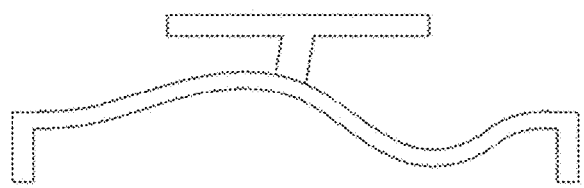
FIG. 2(c)
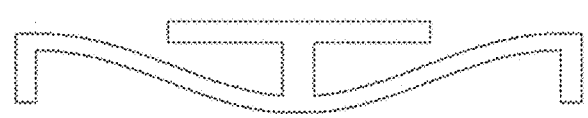

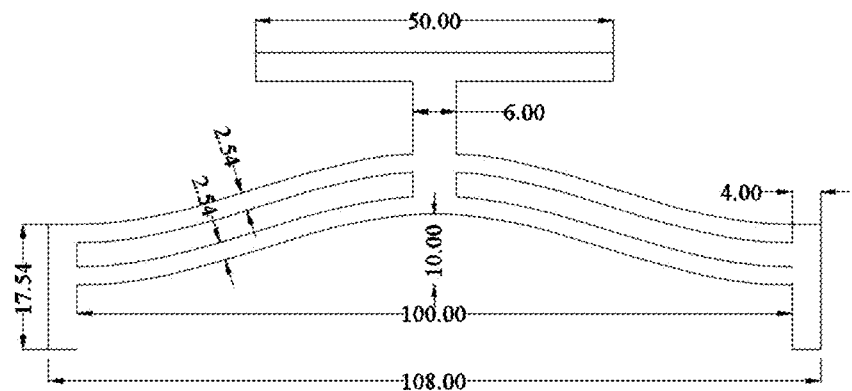
FIG. 19(a)
FIG. 19(b)
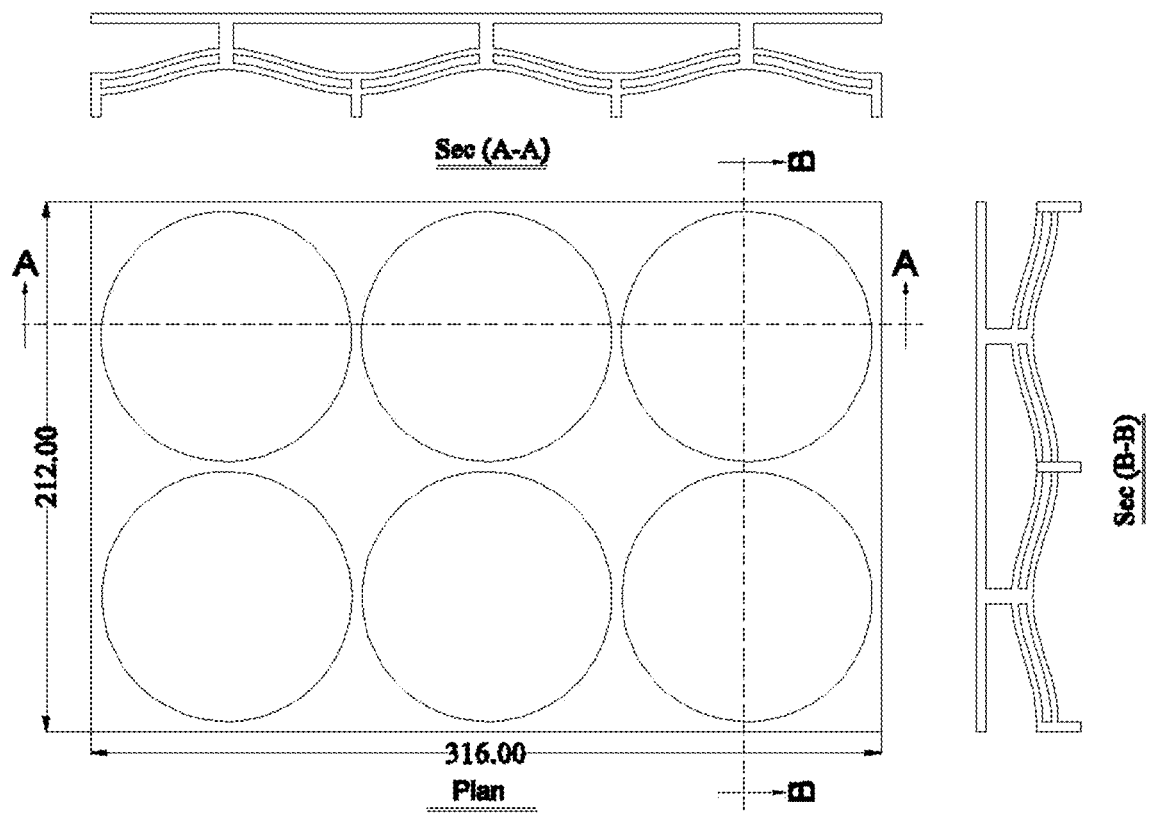

FIG. 19(e)
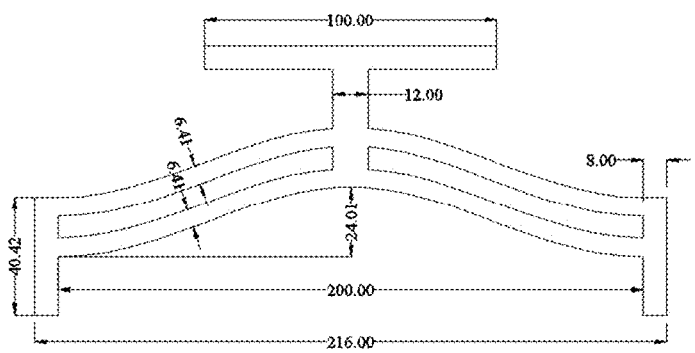
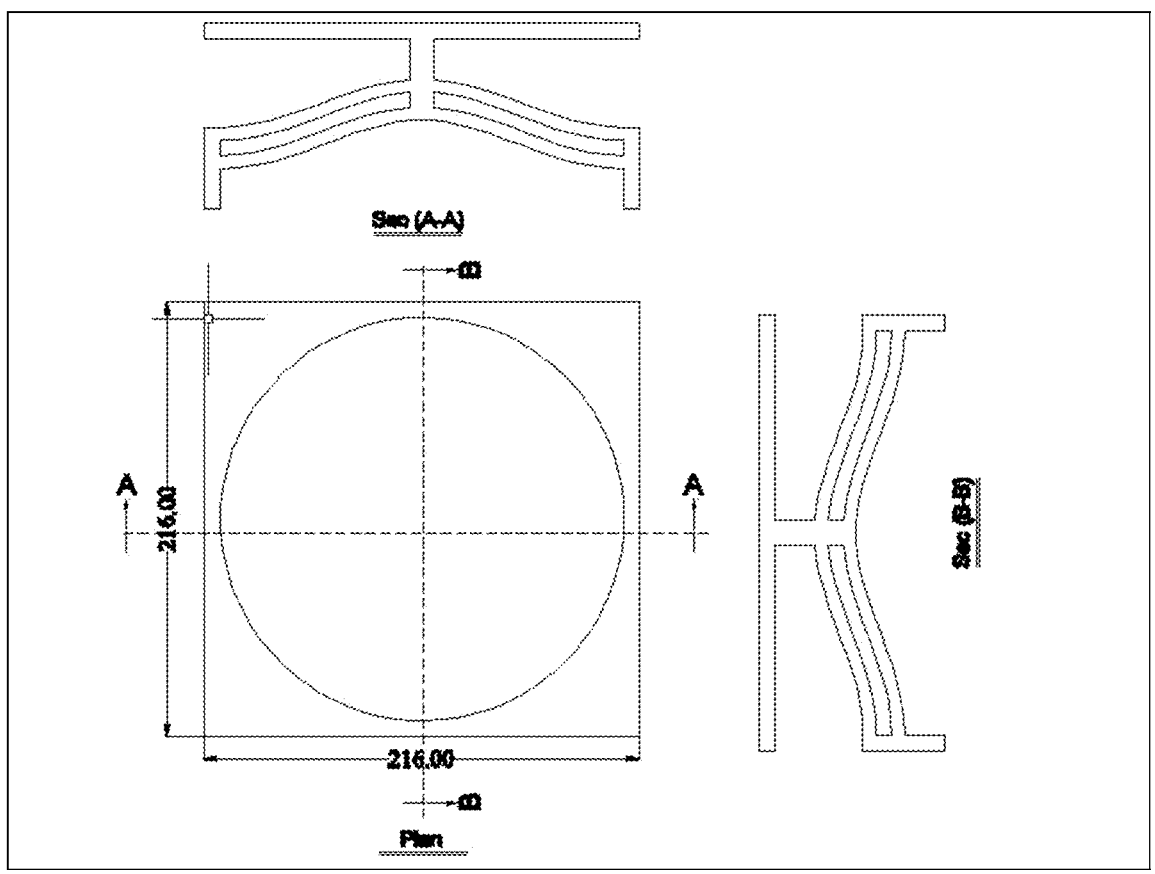
FIG. 19(f)

ENERGY DISSIPATION USING NEGATIVE STIFFNESS SHELLS

STATEMENT OF RELATED CASES

This application is a national application filed under 35 U.S.C. § 371 of International Application No. PCT/US2019/051738, filed Sep. 18, 2019, which claimed priority to Provisional Patent Application No. 62/734,074, filed Sep. 20, 2018, the entire contents of both of which are incorporated herein by reference in their entireties.

BACKGROUND

Metamaterial structures that can exhibit unusual properties that does not exist normally in nature like negative Poisson's ratio, negative stiffness and negative compressibility has become a point of interest nowadays. The ability of such structures to achieve certain desired behavior can be used in different applications. Elastic instabilities of metamaterial structures can be triggered, based on the design and its application, by certain force or displacement threshold. One of the most promising properties of metamaterial structures is negative stiffness. When a structure is subjected to a force, the structure deforms. Should the load and deformation of the structure be in phase; then, the structure has a positive stiffness. Otherwise, the structure had a negative stiffness, i.e., the structure has increasing deformations with decreasing the applied force.

The most common structure that can exhibit negative stiffness is curved beams. Under certain boundary conditions and geometry, curved beams subjected to axial compression can snap through from one stable mode of buckling to another experiencing negative stiffness region in which high levels of energy is dissipated. Multilayer curved beams were used to manufacture honeycomb displaying negative stiffness to replace conventional honeycomb.

Existing beams and honeycomb that display negative stiffness can sustain relatively small force thresholds which makes it suitable for applications such as sound and vibration damping in mechanical systems as well as small impact system such as bicycle helmets. However, the developed beams and honeycomb displaying negative stiffness cannot be used in applications requiring the structure to sustain higher forces or energy dissipation such as impact protection, blast protection, and energy dissipater structures. Therefore, for these applications, developing metamaterial structure that can exhibit negative stiffness behavior but with much higher force thresholds and energy dissipation compared to existing beams and honeycombs displaying negative stiffness has become crucial.

SUMMARY

In one aspect of the present invention, an energy dissipation device for use in absorbing energy associated with an impact to provide protection for a structure generally comprises a shell portion having a convex shape in a first position that defines an interior cavity. The shell portion has a perimeter edge extending around at least a majority of the periphery of the shell portion, and a base portion attached to at least a majority of the perimeter edge. The shell portion is configured for movement in response to a load being applied to an exterior of the shell portion from the first position to a second position in which the shell portion has a concave shape while continuing to absorb energy. The base portion is constructed to resist movement of the shell portion from the first position to the second position by resolving the load applied to the shell portion and transferred to the base portion at the connection of the perimeter edge base portion into a hoop stress resisted by the base portion.

In another aspect of the present invention, a hybrid profile energy dissipating device generally comprises a shell portion having a convex shape in a first position that defines an interior cavity. The shell portion includes a first member and a second member. The first member has a different profile in cross section than the second member. The first member of the shell portion is configured for movement in response to a load at a first threshold being applied to an exterior of the shell portion from the first position to a second position in which the first member of the shell portion has a concave shape while continuing to absorb energy. The second member of the shell portion is configured for movement in response to a load at a second threshold higher than the first threshold being applied to an exterior of the shell portion from the first position to a second position in which the second member of the shell portion also has a concave shape while continuing to absorb energy. Thus, the energy dissipation device exhibits at least two peaks of force thresholds with large energy dissipation capability.

In yet another aspect of the present invention, a modular impact dissipating system generally comprises a first impact dissipating body having a base portion and a bistable shell portion connected to the base portion, and a second impact dissipating body having a base portion and a bistable shell portion connected to the base portion. The first and second impact dissipating bodies are configured for interconnecting with each other to form the impact dissipating system.

In a further aspect of the present invention, an energy dissipating device generally comprises a dome-shaped shell having a convex exterior surface and a perimeter extending in a closed loop around the shell. The shell is constructed to resist a load applied to the convex exterior surface of the shell up to a threshold, and to transition to a position in which the convex exterior surface becomes a concave exterior surface.

Other features of the present invention will be in part apparent and in part pointed out hereinafter.

BRIEF DESCRIPTION OF THE DRAWINGS

FIG. 1 is an example of single layer NS shell that has the ability to exhibit negative stiffness behavior;

FIG. 2(a) is a schematic illustration of a cross section of the NS shell shown in an initial position prior to receiving a force causing deflection and transition to a second position;

FIG. 2(b) is a schematic illustration of the NS shell shown during transition from the initial position to the second position;

FIG. 2(c) is a schematic illustration of the NS shell after transition in the second position;

FIGS. 19(a)-19(f) are different solutions for dissipating force where a 10 kN threshold resistance is required;

Corresponding reference characters indicate corresponding parts throughout the several views of the drawings.

DETAILED DESCRIPTION

Figure 3:
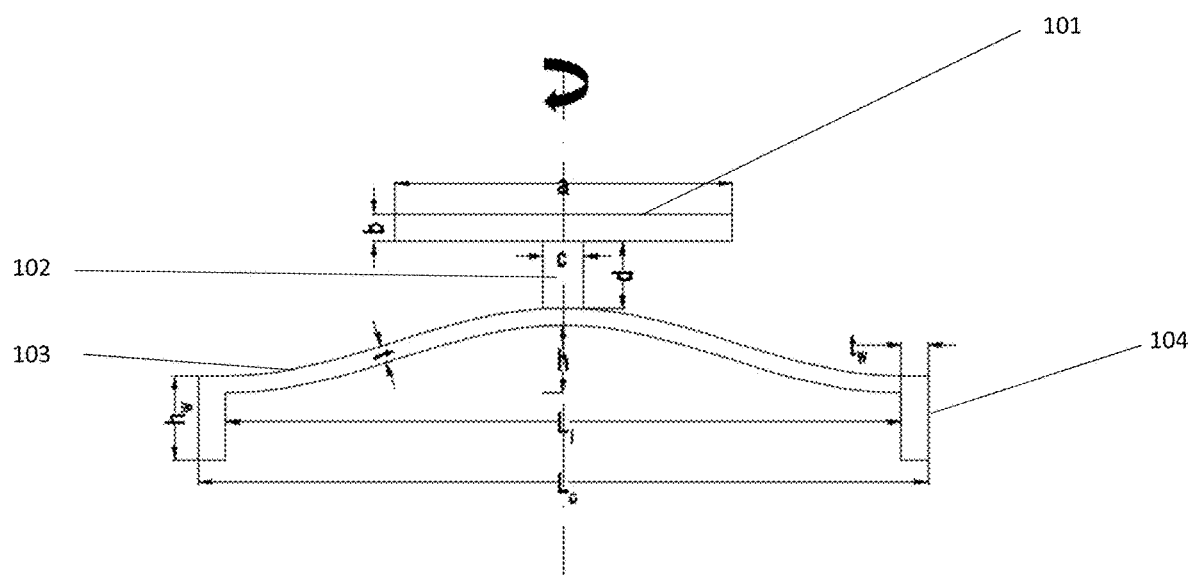
FIG. 3 is cross section of the NS shell showing different dimensions which are tailored based on engineering design.

The developed shell designed using the characteristic of negative stiffness structures to provide much higher energy dissipation and force threshold compared to existing honeycomb and beams displaying negative stiffness. Furthermore, the designed shell structure is capable of recovering its initial configuration. The shell may be used, for example and without limitation, in energy dissipation equipment, impact protection, blast protection, base isolators and vibration damping.

A shell structure (broadly, "energy dissipation device") made according to the principles of the present invention exhibits a negative stiffness behavior similar to curved beams but with much higher force thresholds as well as higher levels of energy dissipation. The shell 100 designed to go through negative stiffness behavior under designed geometry, boundary conditions, and loading. Hereafter the shell will be designated as "NS shell". FIG. 1 shows an example embodiment of the proposed negative stiffness shell structure or NS shell 100. A shell portion or dome-shaped member 103 forms the part of the shell 100 that displays negative stiffness. The dome-shaped member 103 is supported on base portion or sidewall 104 which is a continuous, annular sidewall. A horizontal circular plate member 101 is arranged for applying the loads on the shell. It will be understood that the shape of the plate member 101 may be other than illustrated within the scope of the present invention. A vertical cylinder member 102 (broadly, "an input member") connects the plate member 101 to the dome-shaped member 103 and transfers load applied to the plate member 101 by an external source to the dome-shaped member and thence to the side wall 104. It will be understood that the shape of the vertical cylindrical member 102 can be other than cylindrical.

The dome-shaped member 103 of the developed NSS 100 shown in FIG. 1 has been configured to exhibit negative stiffness behavior when subjected to transverse, i.e., out-of-plane compression load. As an example, if compression load is applied to plate member 101, the load is transferred to the reminder of the NS shell 100 via member 102 in a direction perpendicular to the surface of the dome-shaped member 103. The dome-shaped member 103 is supported by the continuous, annular side wall 104 which triggers the deformation of the NS shell 100 until the applied load reaches a designed force threshold. After the threshold is reached, then the shell goes through snap-through deformation. Once snap through has occurred, the load carrying capacity of the shell is diminished; however, it is still capable of nonlinearly elastically deforming until it completely reversed its configuration. This functionality leads to exhibiting negative stiffness behavior due to such transition. The supporting self-contained side wall 104 provides the dome-shaped member 103 with higher stiffness and hence higher force threshold and energy dissipation compared to the existing single-beam and honeycomb structures; the sidewall has internal equilibrium of forces due to their natural structure. The transition of the shell from one position to the other is schematically illustrated in FIGS. 2(a)-2(c). In FIG. 2(a), the NS shell 100 in an initial (first) undeformed position (i.e., the dome-shaped portion 103 is undeformed) prior to the application of force to the NS shell. After the force applied to the NS shell 100 reaches a level sufficient to initiate transition, the NS shell, and specifically the domed-shaped member 103 begins to deform as illustrated in FIG. 2(b). Finally, the NS shell 100 snaps from a deformed configuration to the second position shown in FIG. 2(c).

Figure 4:
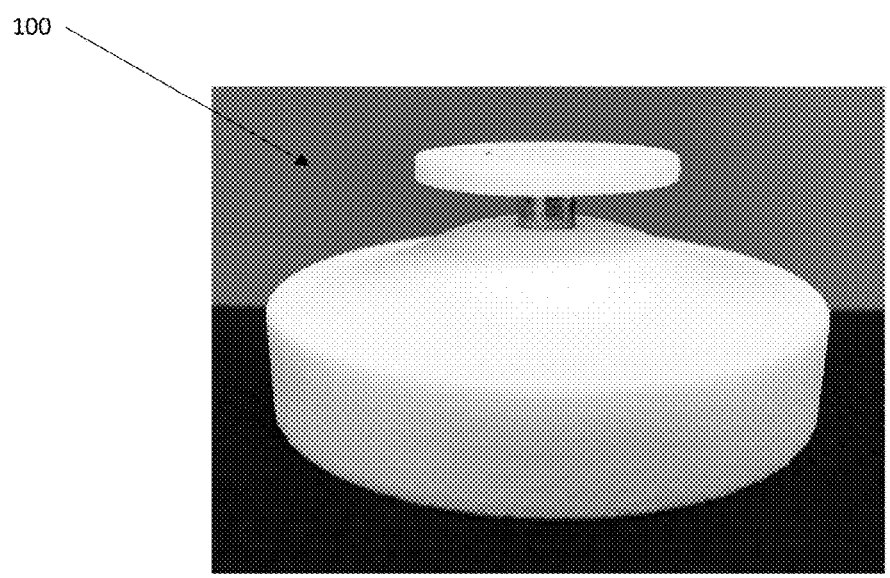
FIG. 4 is a perspective of a sample prototype of single layer NS shell before testing.

A cross section of NS shell 100 structure is shown in FIG. 3. The profile shown in FIG. 3 is revolved 360° around the middle vertical axis to form the NS shell structure (i.e., NS shell 100). The design and hence the dimensions of the structure vary depending on the design force threshold and energy dissipation. In the embodiment of FIG. 3, the dome-shaped member 103 has a thickness t supported on the sidewall 104 with a height of $h_w$, a thickness of $t_w$, an internal diameter of $L_i$ and an external diameter of $L_o$. Apex height of the shell, i.e., the height of the dome-shaped member 103 at the center of the shell above the top of the sidewall 104 is h. Plate member 101 has a diameter of a with a thickness of b. Cylinder member 102 has a diameter c with a height d. The profile used for the shell structure is similar to that used for curved beams but with revolving the profile around the middle vertical axis to form a shell and adding the self-contained sidewall. An example of a prototype used during the experimental testing by the inventors of the shell structure having negative stiffness capabilities is shown in FIG. 4 This prototype was manufactured using selective laser sintering. However, this is not a requirement as any other manufacturing technique can be used.

Figure 5:
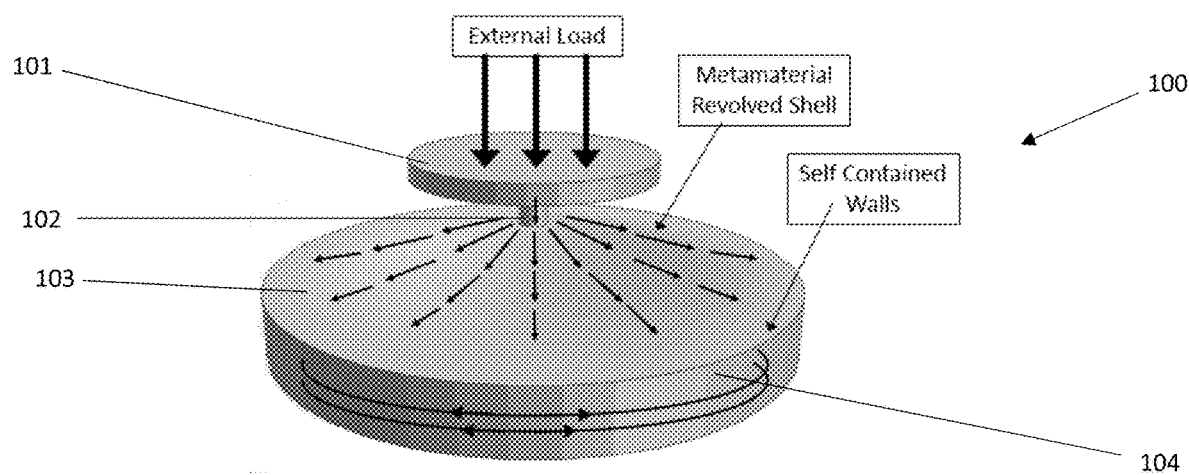
FIG. 5 is a schematic illustration showing the application of load and load path through single layer shell designed to display negative stiffness behavior.
Figure 6:
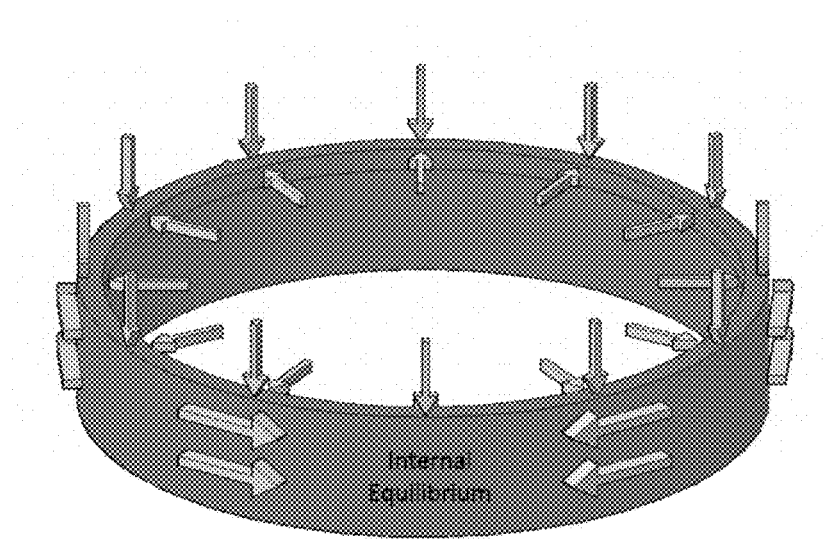
FIG. 6 is a schematic illustration for the internal forces on the self-contained ring side wall of the proposed single layer NS shell.

When a compressive load applied to member 101 of the NS shell 100, the load transfers through the vertical cylindrical member 102 to dome-shaped member 103. Dome-shaped member 103 goes through restrained deformation because of to the presence of the supporting sidewall 104. In the illustrated embodiment, the dome-shaped member 103 has a perimeter that extends in a closed loop (a circle as shown) around the dome-shaped member. It will be understood that the perimeter could have other shapes. The perimeter edge of the dome-shaped member 103 is everywhere connected to the sidewall 104 so that the perimeter edge is constrained from movement. It is also possible for the perimeter edge to be connected only at intermittent locations to the sidewall 104. In one embodiment, a majority of the perimeter edge is connected to the sidewall 104. In another embodiment, at least three quarters of the perimeter edge is connected to the sidewall 104. The entire loading path is illustrated in FIG. 5. Once the applied load reaches to a designed force threshold, the shell starts to go through negative stiffness. These deformations impose significant forces on the sidewall as shown in FIG. 5. The sidewall has internal force equilibrium as illustrated in FIG. 6 which is quite unique to the NS shell 100 and allows the design of sidewall having minimal thickness. The existence of sidewall 104 provides the shell with higher stiffness allowing the shell to achieve higher levels of force thresholds and energy dissipation because the sidewall 104 is able to strongly resist the hoop stress applied to it from the dome-shaped member 103.

Figure 7:
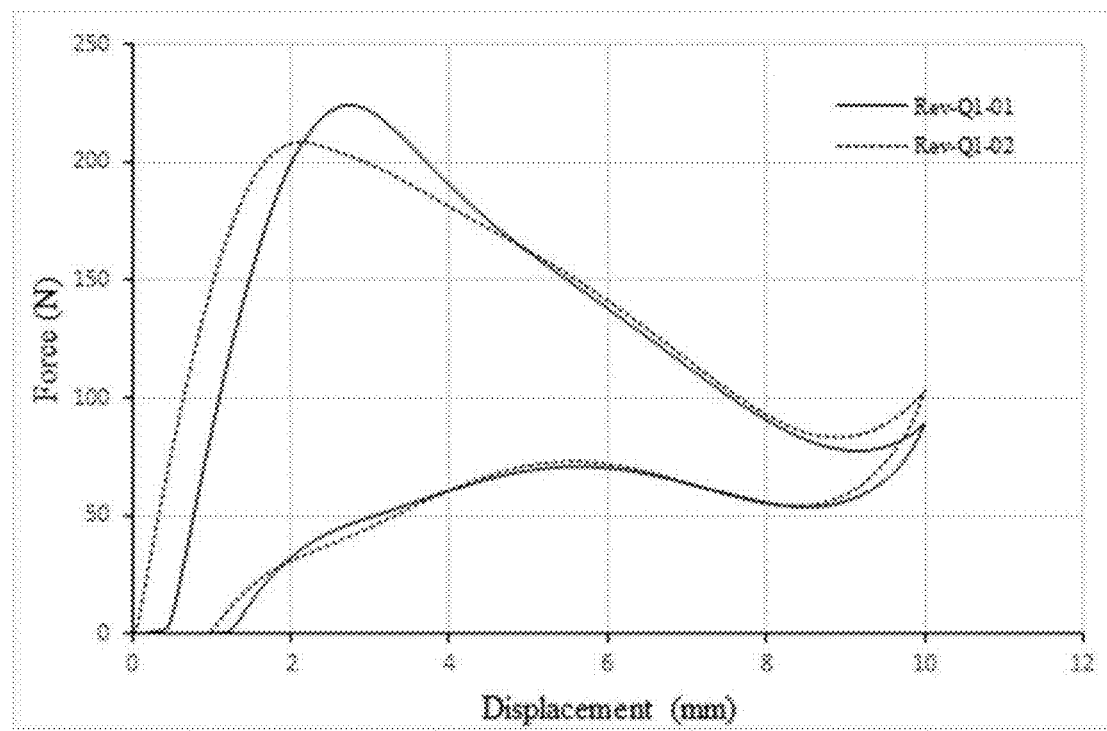
FIG. 7 is a graph of experimental results showing the relationship between force and displacement for two identical prototypes of the proposed single layer NS shell.

FIG. 7 shows the experimental relationship between the displacement and applied force of two identical prototypes, each having a single layer of the invented NS shell 100 tested under compression loading for one complete cycle of loading and unloading. As shown in graph, the NS shell 100 of the present invention experienced a decrease in the applied force, once it reached its force threshold of approximately 210 N, accompanied by an increase in displacement which represents the negative stiffness region. These results are a function of the dimensions of the tested prototype, boundary conditions, and material of NS shell 100. As the structure deforms in the elastic zone of the material, minimal permanent deformations took place after testing the prototype which gives the structure the potential to recover its initial configuration and be reusable for multiple loading cycles. The area between the loading and unloading curves represents the amount of energy dissipated through the NS shell 100. The absorbed energy is approximately 70% of the total input energy. Energy dissipation per unit mass of NS shell was found to be 3 times that of curved beam in the general case and increases up to 10 times in special cases.

Figure 8A:
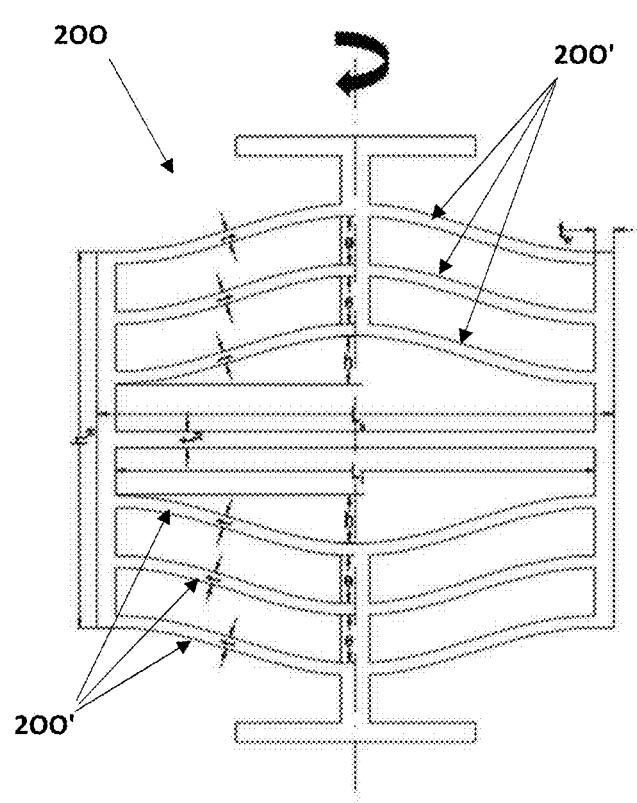
FIG. 8(a) is a schematic cross section of an example of using multiple layer NS shells connecting to each other in-series to form a shell unit.
Figure 8B:
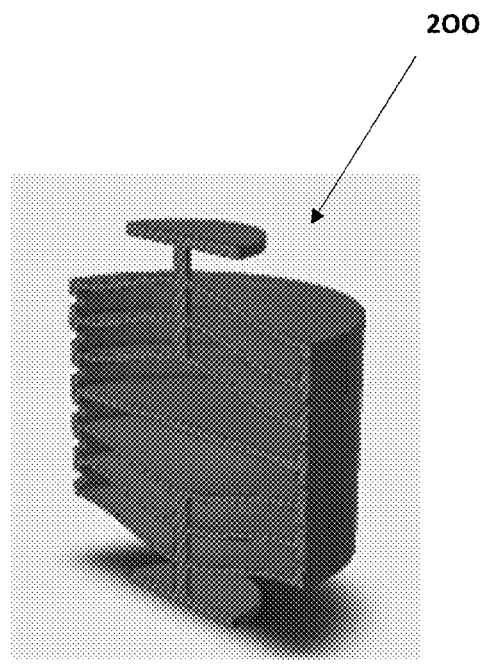
FIG. 8(b) is a cross section in perspective of the multiple layer NS shells of FIG. 8(a)
Figure 9:
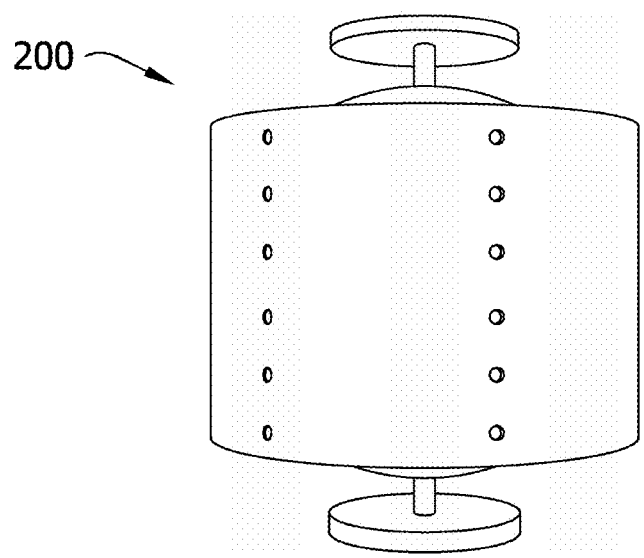
FIG. 9 is a front view, before testing, of a sample prototype shell unit manufactured using multiple layer NS shells of the type shown in FIGS. 8(a) and 8(b)

The NS shell can be designed and manufactured to display higher force threshold levels and energy dissipation compared to available single beam and honeycomb which allow the applications of the NS shell in different fields. To increase the force threshold and/or energy dissipation of the NS shell, multiple shells can, for example, be arranged in-series to form an NS shell unit 200 comprising array of shells 200' as shown in FIGS. 8(a) and 8(b). It will also be understood that the NS shells can be arranged in parallel, and that combinations of shells and shell units can be arranged in series and/or in parallel depending upon the specific need. Moreover, the NS shells 200' making up the shell unit 200 do not need to be identical. Still further, the shells 200' and shell units 200 can be of different dimensions. The NS shell unit 200 in FIGS. 8(a) and 8(b) has three shells 200' oriented in one direction and another three shells 200' oriented in the opposite direction. The designed number and orientation of the shells vary depending on the demand on the force thresholds and energy dissipation. FIG. 9 shows an example of a multi-shell manufactured prototype structure.

Figure 10:
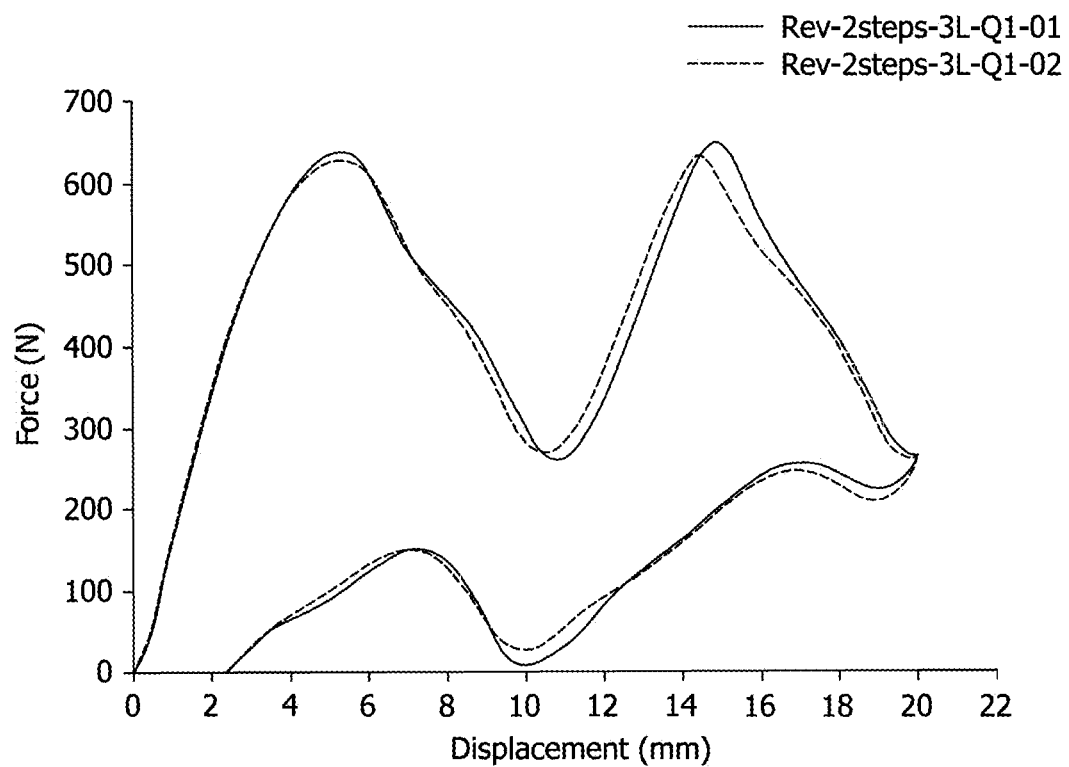
FIG. 10 is a graph of experimental results showing the relationship between force and displacement for two identical prototypes of the multiple layer NS shell unit according to FIG. 9.

FIG. 10 shows the experimental displacement versus applied force of two identical prototypes of multi-NS shell unit 200 comprising three shells 200' oriented in one direction and another three shells 200' oriented in the opposite direction tested under compression loading for one complete cycle of loading and unloading. As shown in FIG. 10, the multi-NS shell unit 200 experienced negative stiffness behavior after reaching force threshold of approximately 610 N which represents the accumulation of the force threshold of the individual in-series shells (200 N). After deforming the first three shells and exhibiting the first negative stiffness region, the structure goes through a positive stiffness region which continued until the structure reaches the accumulated force threshold of the other three shells (610 N); then, the structure goes through a second region of negative stiffness behavior. Having two peaks of force threshold increase the amount of energy dissipated through the structure. In this particular design, the force threshold linearly increases with increasing the number of shells connected in-series. However, the increase in the force threshold depends on the design of the individual shells connected in-series in one orientation. The energy dissipation increases with increasing the number of shells connected in-series in one orientation as well as the number of shell sets. Furthermore, as the constituent material of the structure remains elastic during the deformation of the structure, minimal residual deformations remain in the structure after complete one cycle of deformation and the structure returns back to its original position. As a result of this characteristic, the NS shell unit 200 can be reused for multiple loading cycles.

Figure 11:
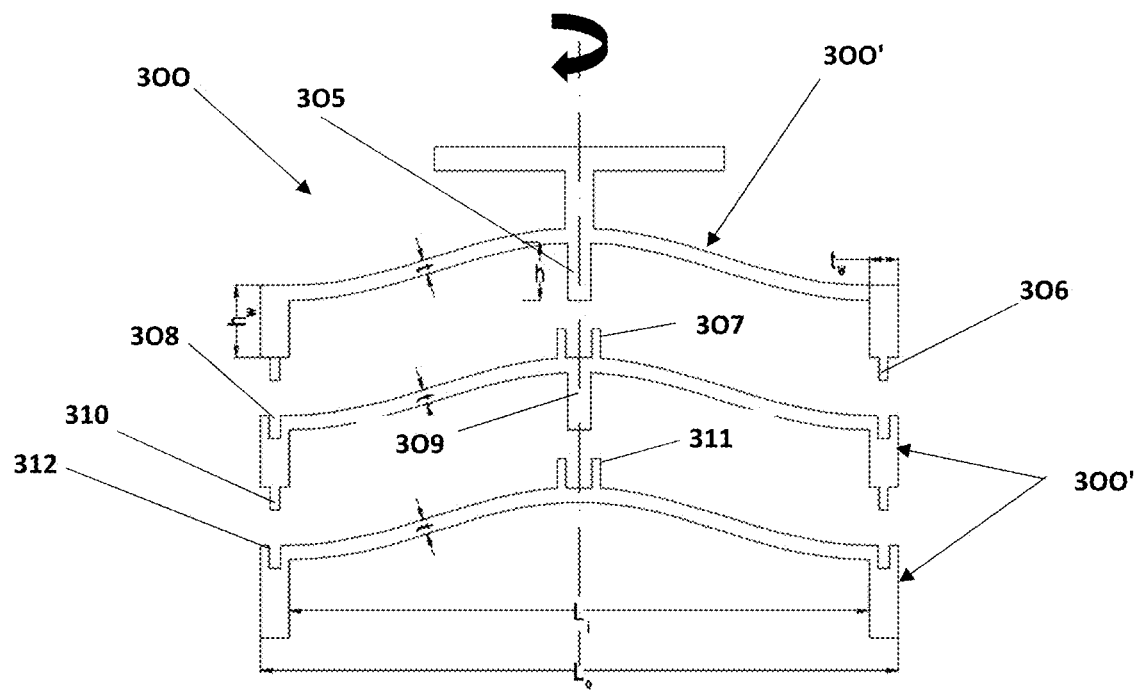
FIG. 11 is an example of connecting a multi-layer NS shell unit via segmental connection.
Figures 12A, 12B, 12C:
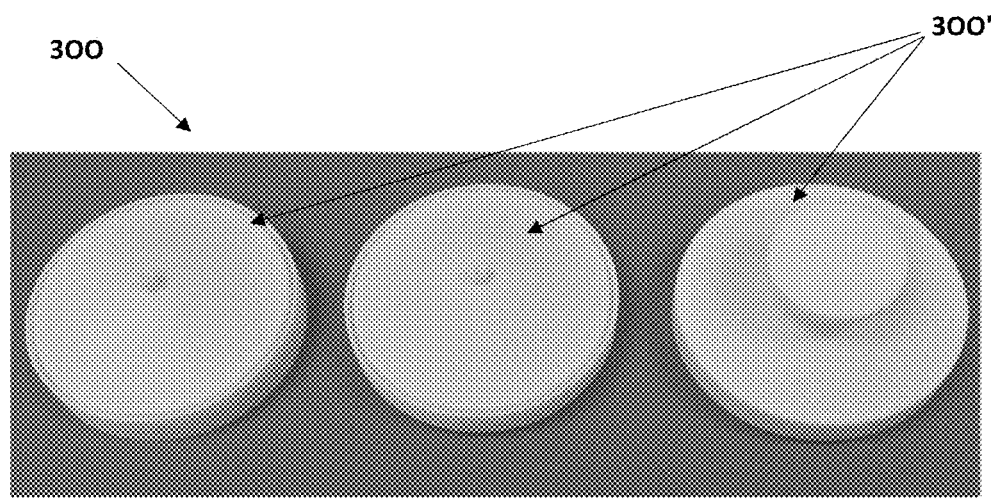
FIG. 12(a) is a first (bottom layer) NS shell of a multi-layer NS shell unit prior to assembly.
FIG. 12(b) is a second (middle layer) NS shell of the multi-layer NS shell unit prior to assembly.
FIG. 12(c) is a third (top layer) NS shell of the multi-layer NS shell unit prior to assembly with the first and second NS shells to form the segmented, multi-layer NS shell unit.
Figure 13:
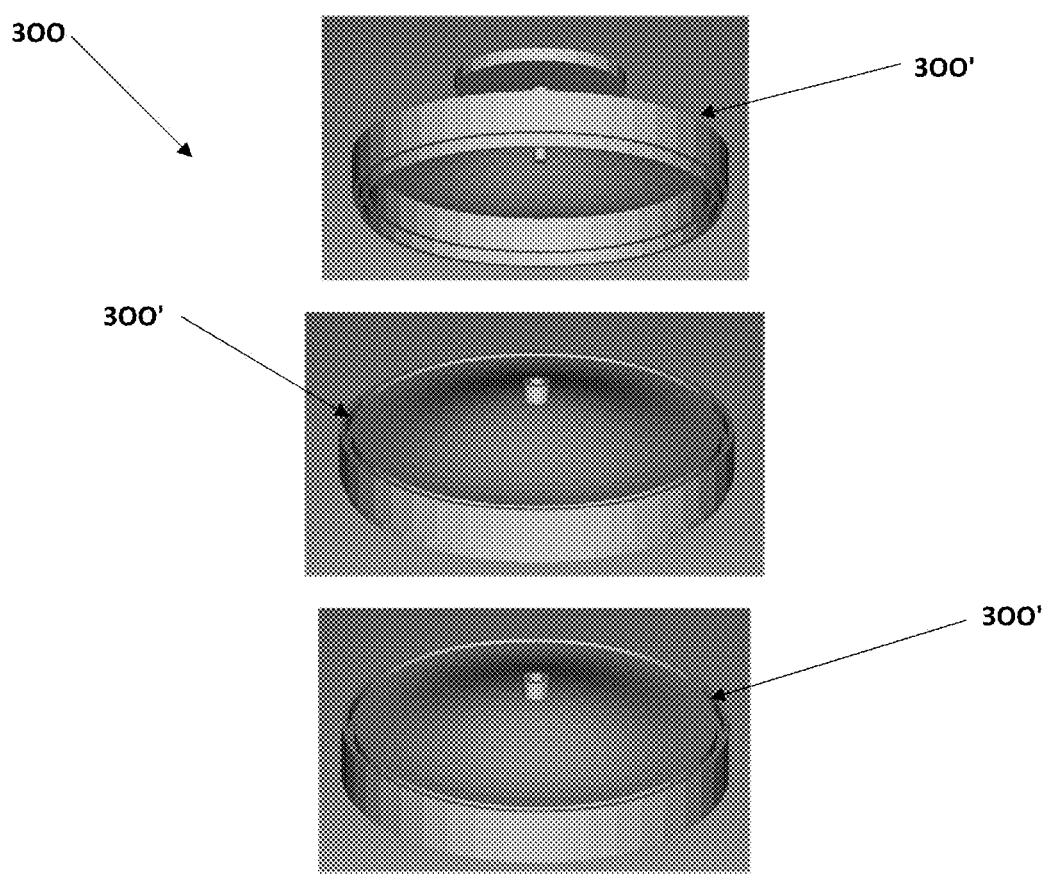
FIG. 13 is an exploded view of the multi-layer NS shell unit arranged to be connected together via segmental connection.

The embodiment shown in FIG. 9 was manufactured as a monolithic structure using Selective Laser Sintering. Another way to construct a multi-NS shell unit 300 is to use segmental construction as shown in FIG. 11. This construction approach is accelerates the construction and facilitates the handling, transport, and production of multi-shell structures. The shells 300' are connected to each other using male-to-female connections. More specifically, the top shell 300' has a center rod 305 and an annular tongue 306 on the bottom of the side wall of the top shell. The center rod 305 and tongue 306 are broadly considered as interconnection structure. It will be understood that the interconnection structure may include connections other than male-to-female. The upper surface of the middle shell 300' has a central socket 307 that can receive the center rod 305 and an annular groove 308 in the top of the side wall that can receive the annular tongue of the top shell. The middle shell 300' also has a center rod 309 on its bottom side, as well as a depending tongue 310 extending down from the bottom of the side wall of the middle shell. The bottom shell 300' has a central socket 311 on its top side that can receive the center rod 308 of the middle shell. The bottom shell 300' also has an annular groove 312 in the top of its side wall that can receive the tongue 310 of the middle shell socket 311. Other ways of interconnecting the shells 300' are envisioned. For example and without limitation, the tongue could be replaced with multiple posts received in corresponding holes in the side walls of the mating shell (not shown). It will be understood that by providing multiple middle shells 300', a NS shell unit of any desired number of shells could be formed. FIG. 12 shows an example prototype of a segmented multi-NS shell unit comprising three shells 300'. FIG. 13 is an illustration for the connection of the three shells 300'.

Figure 14:
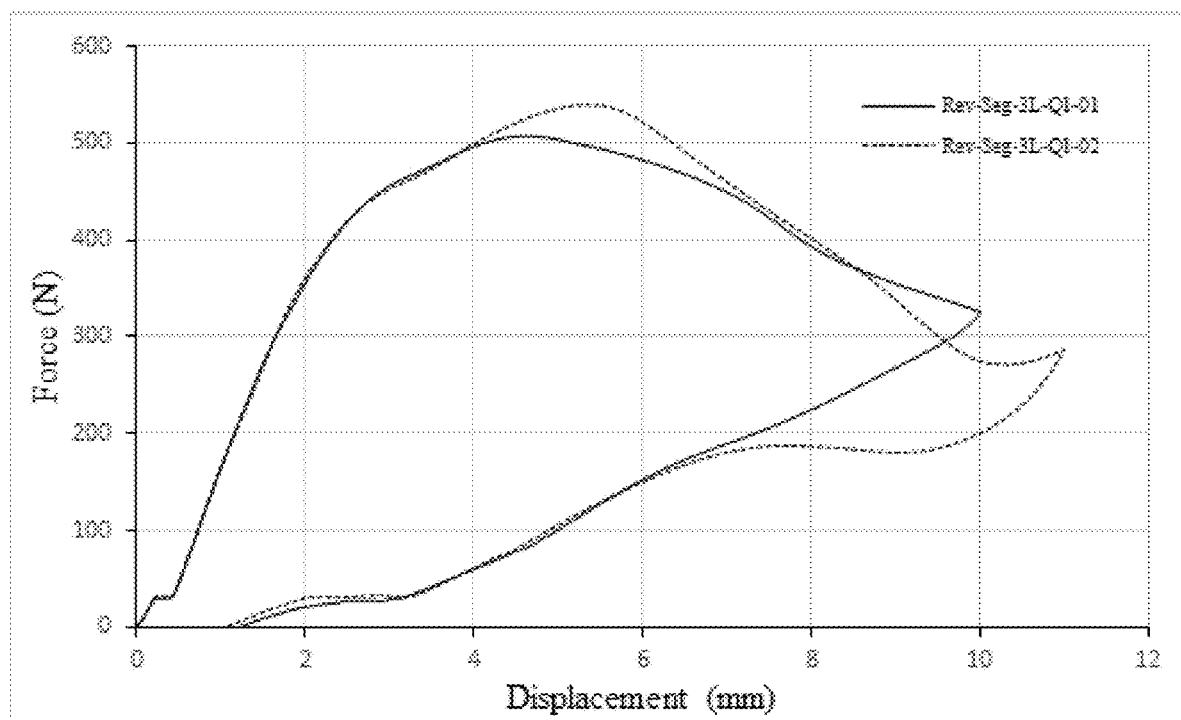
FIG. 14 is a graph of experimental results showing the relationship between force and displacement for two identical prototypes of the multi-layer NS shell unit connected via segmental connection.

FIG. 14 shows the experimental out-of-plane displacement versus applied force of two identical prototype segmental multi-NS shell units 300. Each multi-NS shell unit is made up of three shells 300' oriented in one direction and tested under compression loading for one complete cycle of loading and unloading. As shown in figure, the multi-NS shell unit proved its ability to experience negative stiffness behavior after reaching a force threshold of approximately 510 N. The force threshold was 15% smaller than the corresponding three-shell monolithic structure, i.e., 600 N. This difference was attributed to compromised stiffness of the ring walls due to the segmental connection, however, this difference may be accepted considering the numerous advantages of the segmental system. Furthermore, optimizing the stiffness of the walls at the connection can reduce this difference. The number of shells may vary depending on the demand on energy dissipation of the system.

Figure 15:
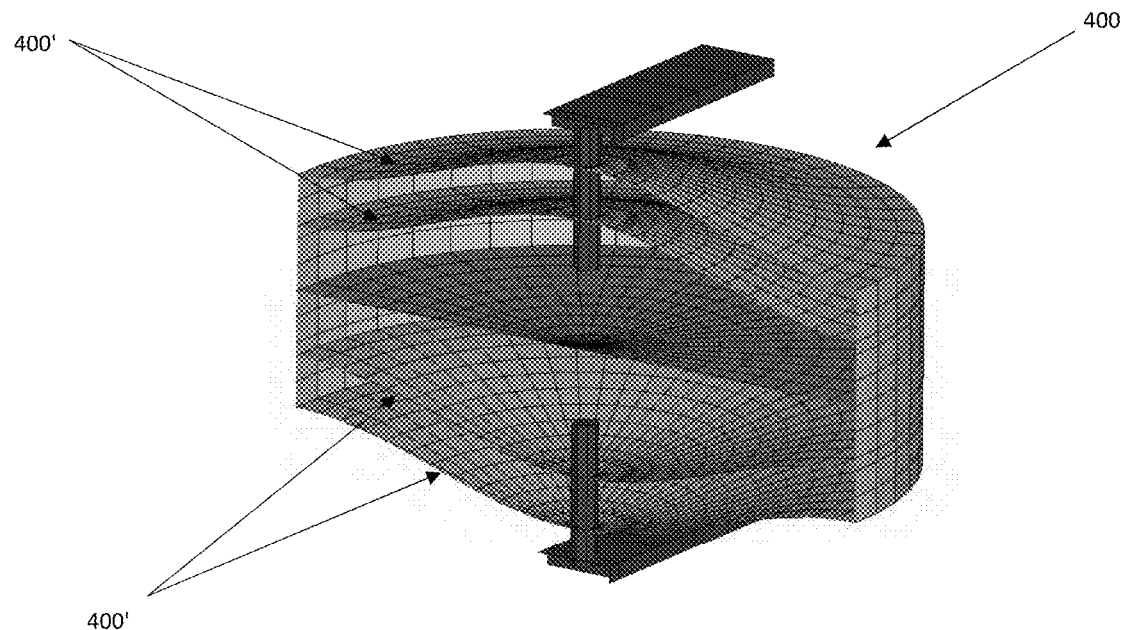
FIG. 15 is an example of finite element modeling of multi-layer NS shell unit.
Figure 16:
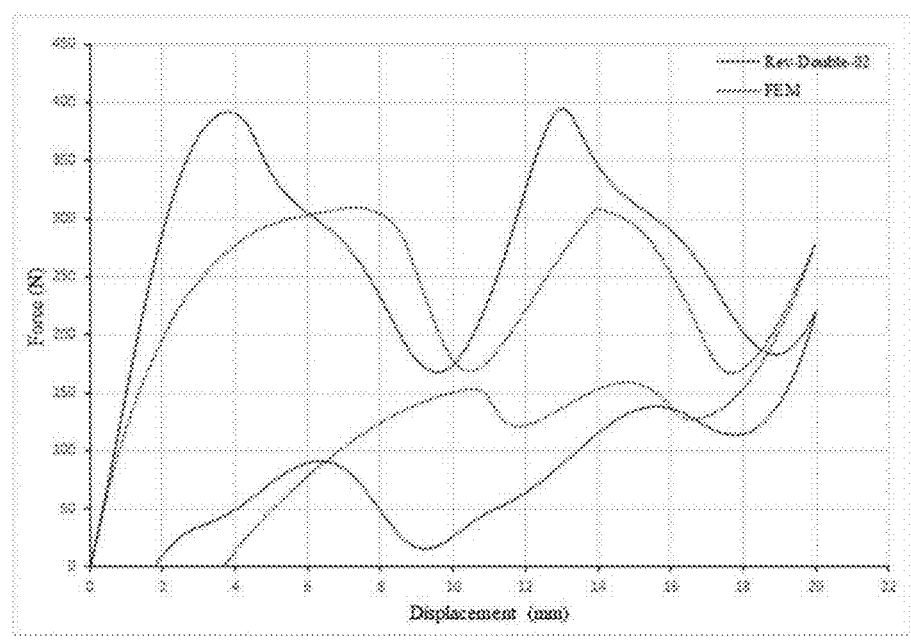
FIG. 16 is a graph of experimental results versus finite element modeling results of an example of multi-layer NS shell unit showing the relationship between force and displacement.

Numerical simulation (finite element analysis) was carried out to model the behavior of the invented NS shell structure subjected to compression loading and to predict the force thresholds as well as the amount of energy dissipated through the structure. The simulation was developed using commercial software readily available in the market. The results were validated against experimental results of several prototype structures developed and tested by the inventors. FIG. 15 shows an example of a simulation of multi-NS shell unit 400. In this example the multi-NS shell unit comprises two shells 400' connected in-series on one orientation and another two shells 400' connected in the opposite orientation. FIG. 16 shows the validation of the numerical simulation results with the experimental testing.

Figure 17:
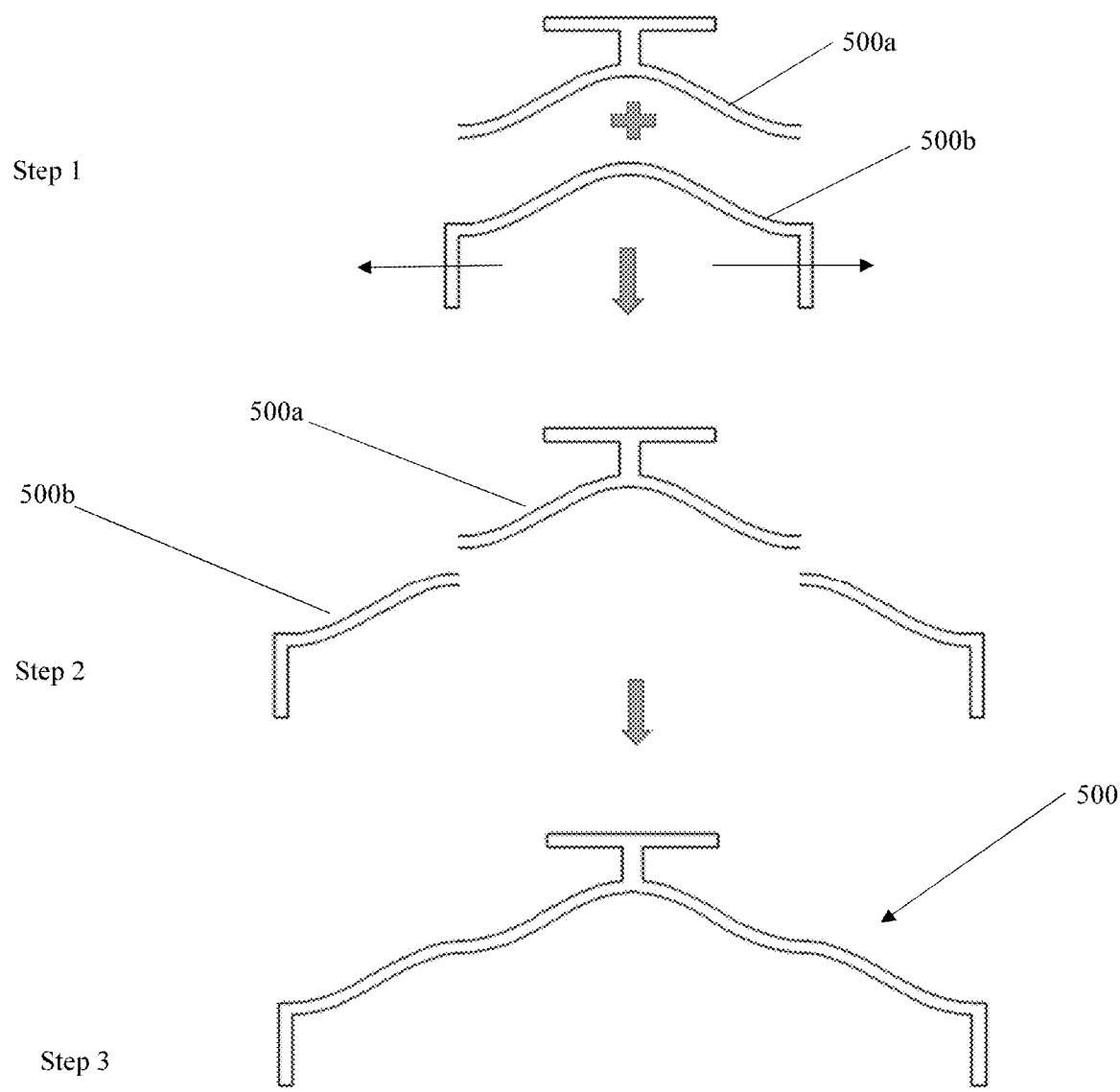
FIG. 17 is a schematic sequence of construction of a hybrid single layer NS shell that can exhibit two zones of negative stiffness behavior.

A hybrid NS shell 500 (broadly, "hybrid energy dissipation device") may have a shell portion formed by integrating a first member 500a and a second member 500b. As may be seen in FIG. 17, the first member 500a has a different profile in cross section than the second member 500b. The first member 500a of the hybrid NS shell is a sacrificial shell used during the first cycle of loading only, as the deformation at this first member is permanent. The advantage of using such profile for the first member 500a is greatly increasing the amount of energy dissipated in the first loading cycle compared to that of a single shell structure or two in-series shells. The first member 500a has a different profile in cross section than the second member 500b. More particularly, the first member 500a has a radius of curvature that is smaller than the radius of curvature of the second member 500b. As shown, the first member 500a is located generally in the center of the shell and the second member 500b is located radially outwardly from the first member. Other configurations, including shells (not shown) have more than two members of different profiles may be used. Moreover, the differences in profile may be other than differences in radii of curvature.

Figure 18:
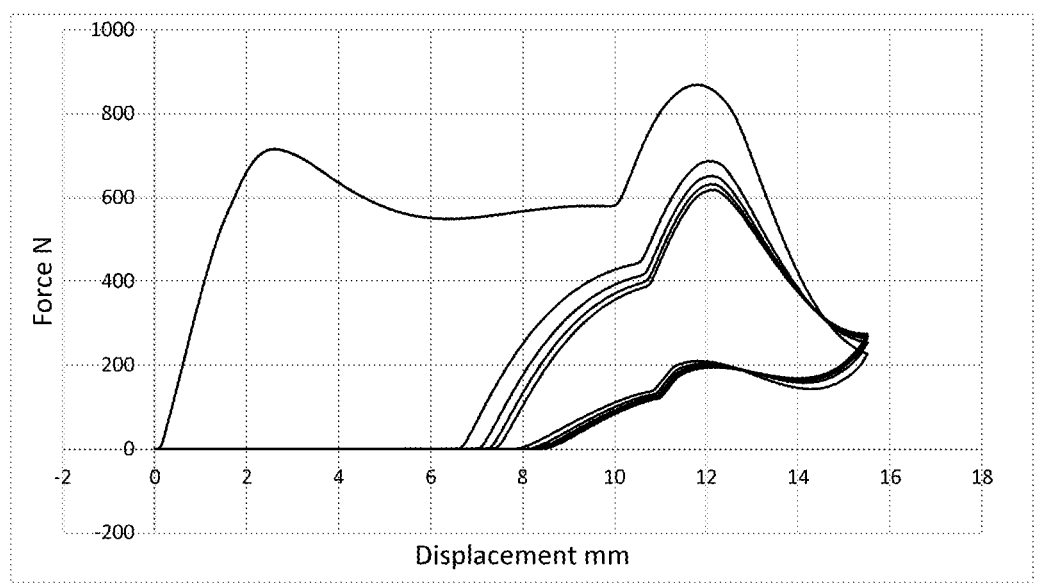
FIG. 18 is a graph of experimental results showing the relationship between force and displacement for the hybrid NS shell.

FIG. 18 shows the significant difference between the energy dissipated during the first loading cycle and the rest of the loading cycles. The introduced hybrid NS shell 500 that is a blend of a first member 500a and second member 500b of different profiles has the potential to be used in special applications that require huge energy dissipation during the first loading cycle and smaller amount of energy dissipation during the remaining loading cycles. The hybrid NS shell 500 has the ability to exhibit two (as shown in FIG. 18) peaks of force thresholds with large energy dissipation capability during the first few loading cycles. After the first few loading cycles, the hybrid NS shell 500 exhibits normal energy dissipation. It will be understood that a hybrid NS shell (not shown) could have more than two force threshold peaks.

The following non-limiting examples are provided for certain embodiments of the present invention.

Example 1

Figure 19C:
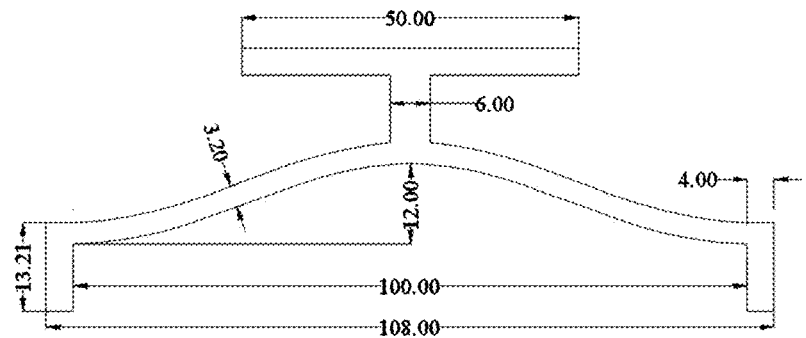
Figure 19D:
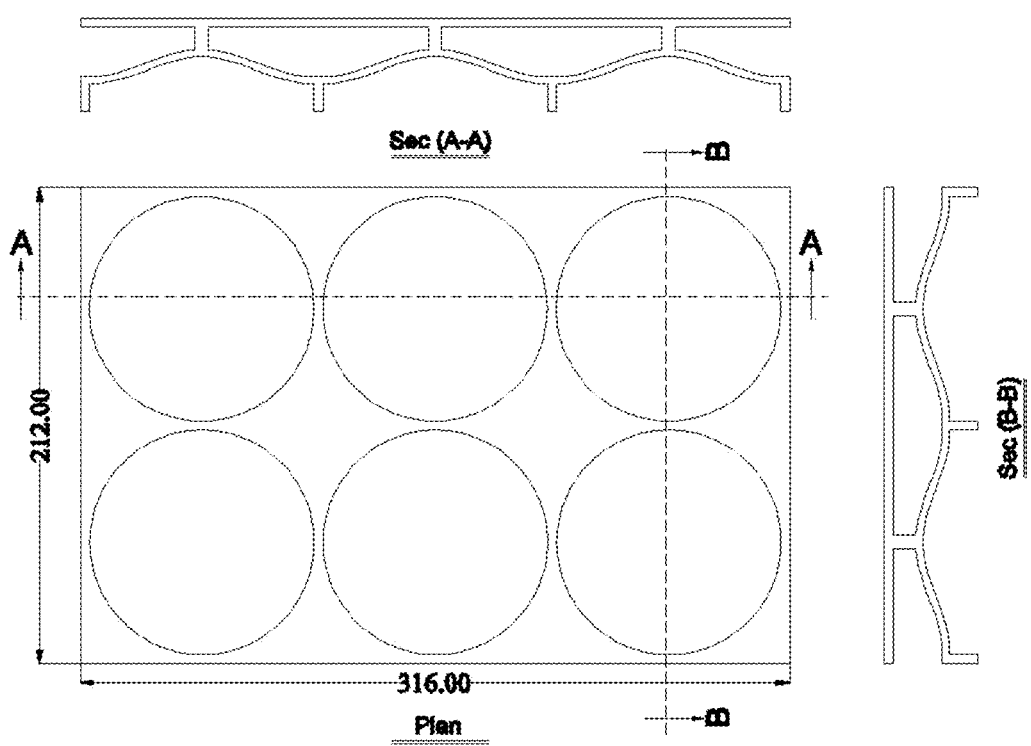
Figure 20A:
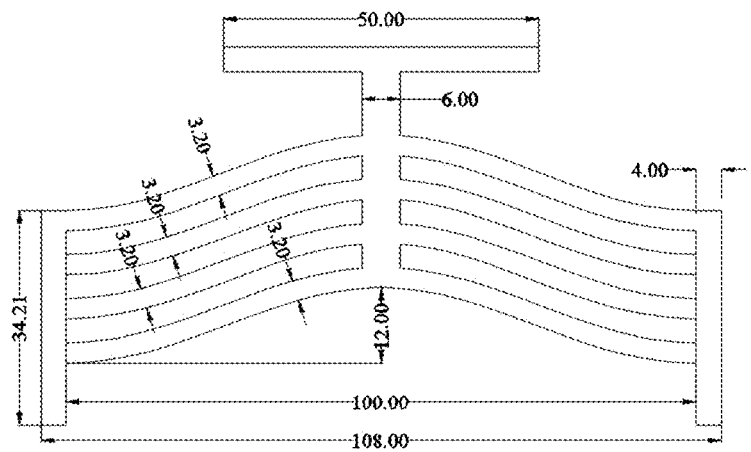
FIGS. 20(a)-20(f) are different solutions for dissipating force where a 1000 kN threshold resistance is required.
Figure 20B:
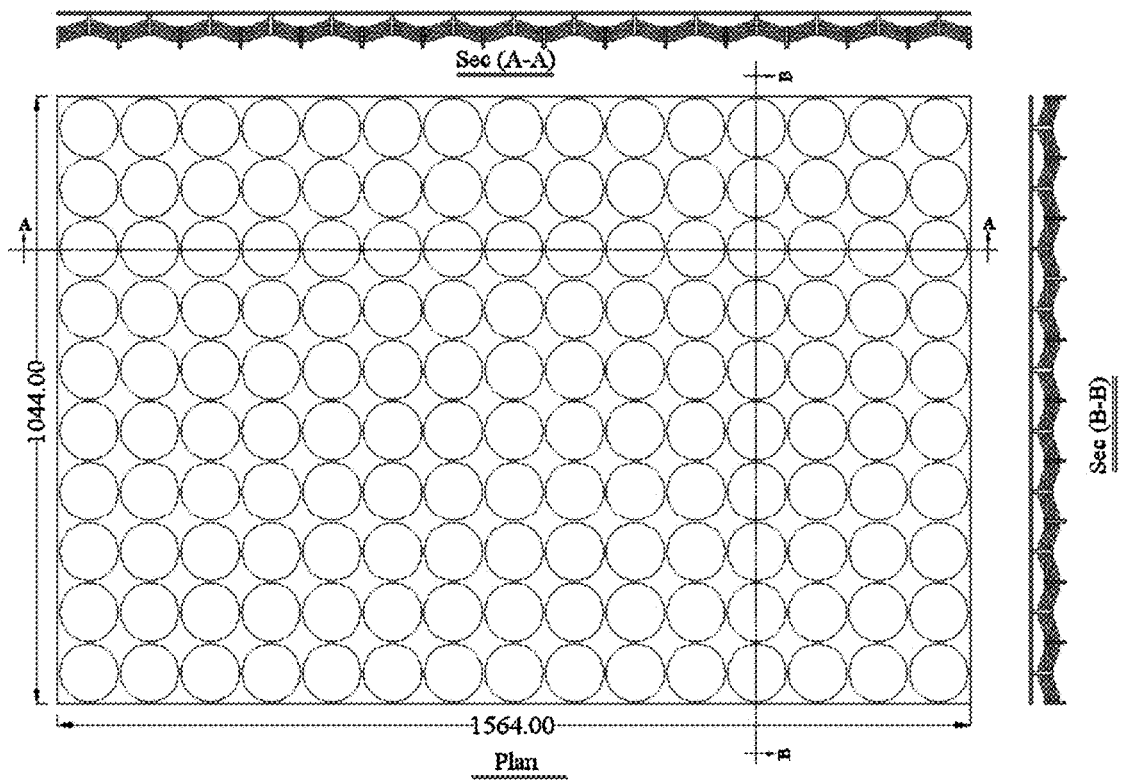
Figure 20C:
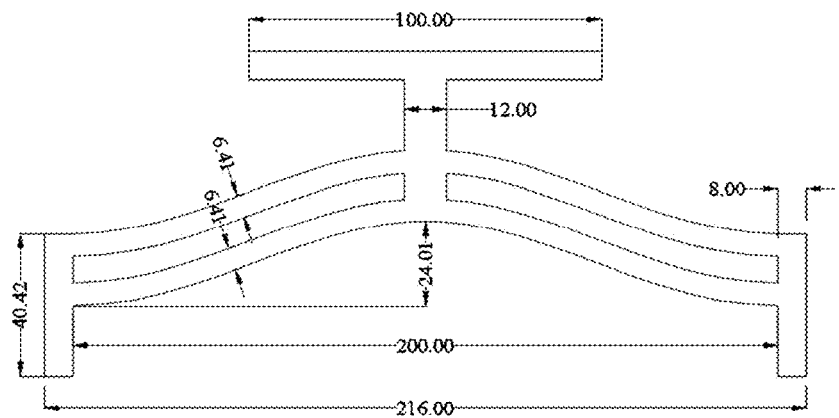
Figure 20D:
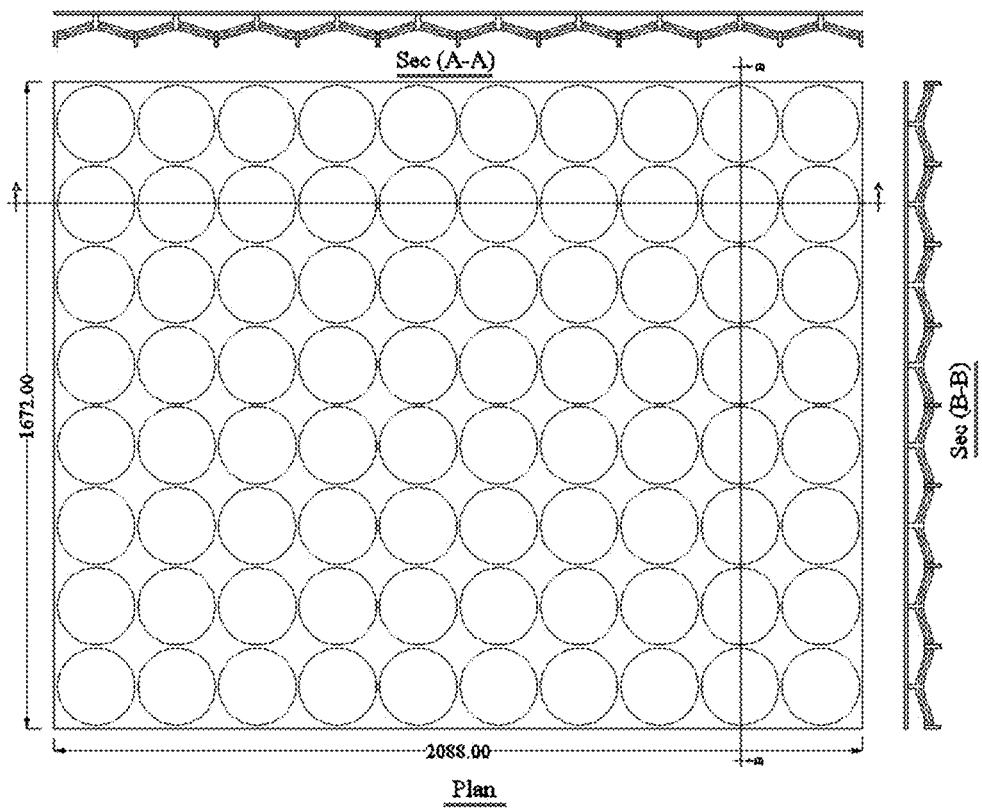
Figure 20E:
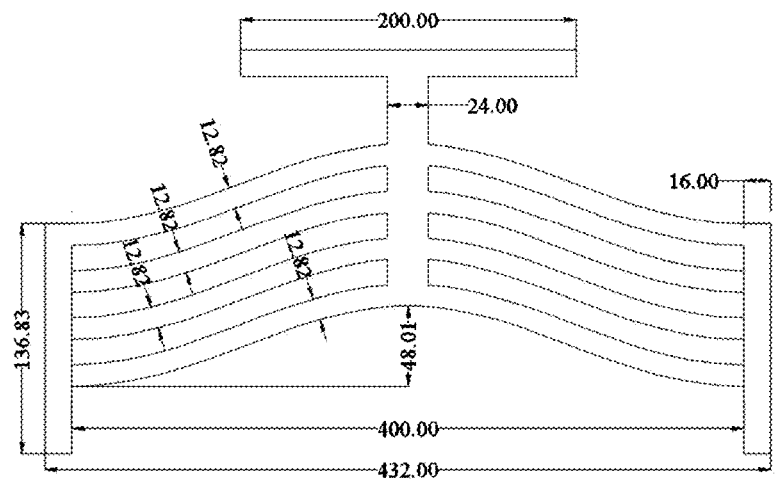
Figure 20F:
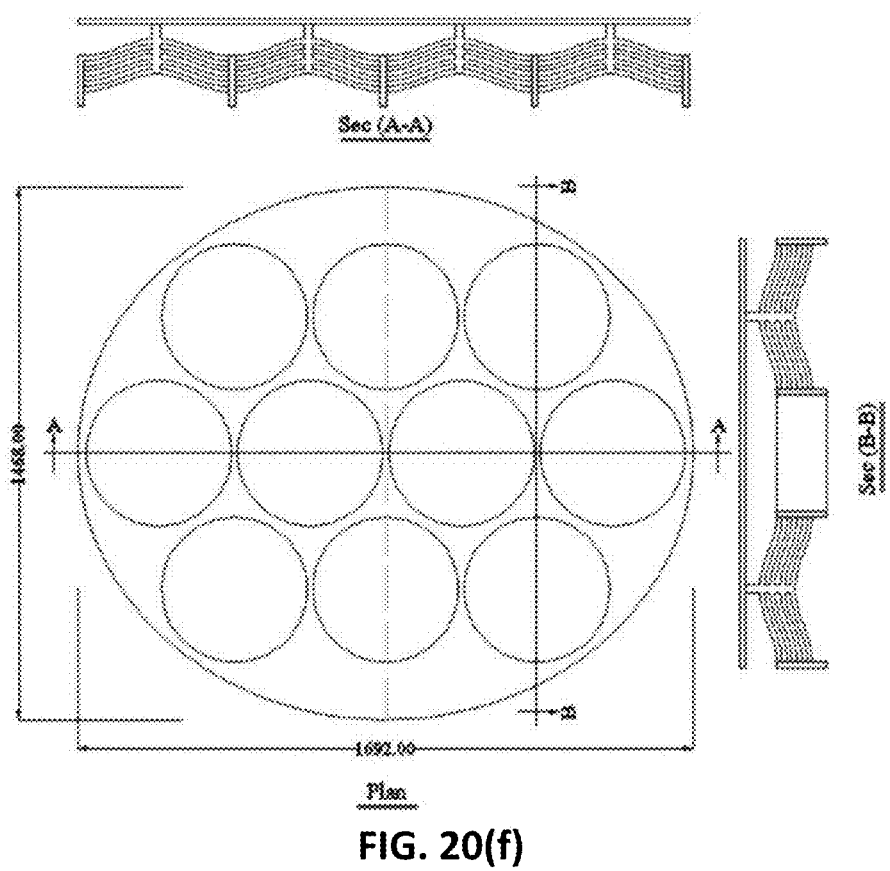

For an example, if the desired application require a system with force threshold of 10 kN (1 ton), Infinite number of different configurations and profiles of NS shell structure may be designed to satisfy such requirement. The following are three different alternative solutions:
  First solution: A panel 212×316 mm consists of 6 units of NS shell each with two shells with configuration and profile shown in FIGS. 19(*a*) and 19(*b*).
  Second solution: A panel 212×316 mm consists of 6 units of NS shell each with one shell with configuration and profile shown in FIGS. 19(*c*) and 19(*d*).
  Third solution: One unit of NS shell with two shell layers and profile shown in FIGS. 19(*e*) and 19(*f*).

Notwithstanding the fact that the force threshold in the three solutions is approximately the same, the amount of energy dissipated differs from one solution to another. Differences can arise for, among other reasons, differences in profile of the shells, different numbers of layers of shells and different arrangements of shells and/or shell units. It is possible to design different solutions for initial force threshold and energy dissipation through the design of the individual shells as well as the arrangement of shells. Therefore, the full design needs to consider the force threshold, initial stiffness and the energy dissipation in a holistic approach as they are inter-correlated and the external load demand needs to be considered as part of this design.

Example 2

Another example, if the desired application requires a system with force threshold 100 times the force in the first example (1000 kN), three different alternative solutions from the infinite number of solutions are as follow;
  First solution: A panel 1564×1044 mm consists of 150 units of NS shell each with four shells with configuration and profile shown in FIGS. 20(*a*) and 20(*b*).
  Second solution: A panel 2088×1672 mm consists of 80 units of NS shell each with two shells with configuration and profile shown in FIGS. 20(*c*) and 20(*d*).
  Third solution: An elliptical panel 1692×1468 mm consists of 10 units of NS shell each with four shells with configuration and profile shown in FIGS. 20(*e*) and 20(*f*).

All examples are based on Nylon PA2200 material, changing the material will affect the results based on the new material properties. Using materials with higher modulus of elasticity and similar yield strain to Nylon PA2200 will increase the force threshold as well as the amount of energy dissipated through the system. All examples drawings are 2D drawings to show the dimensions and configuration of the system suggested in each example.

Figure 21:
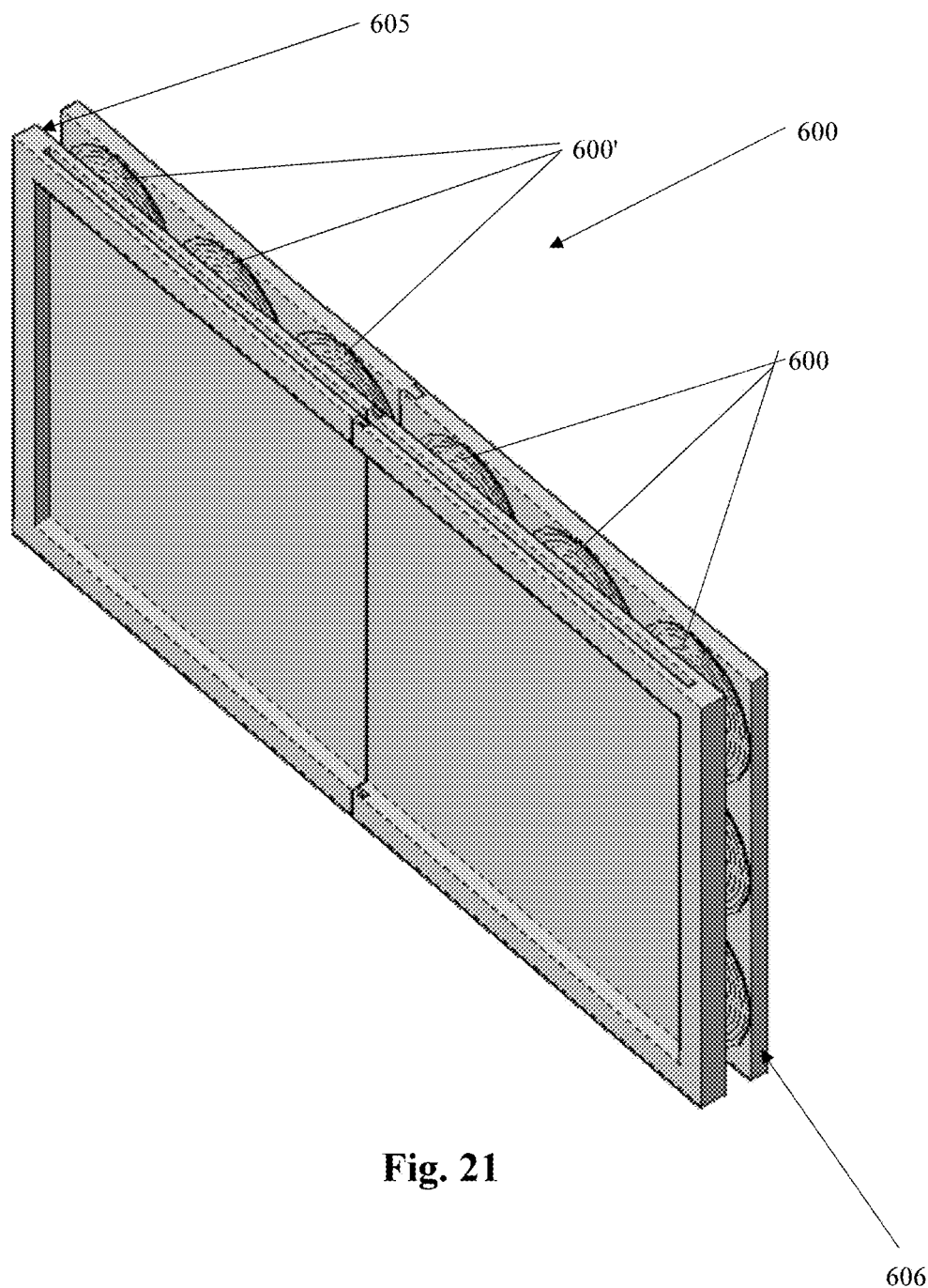
FIG. 21 is a perspective of a NS shell array.
Figure 22:
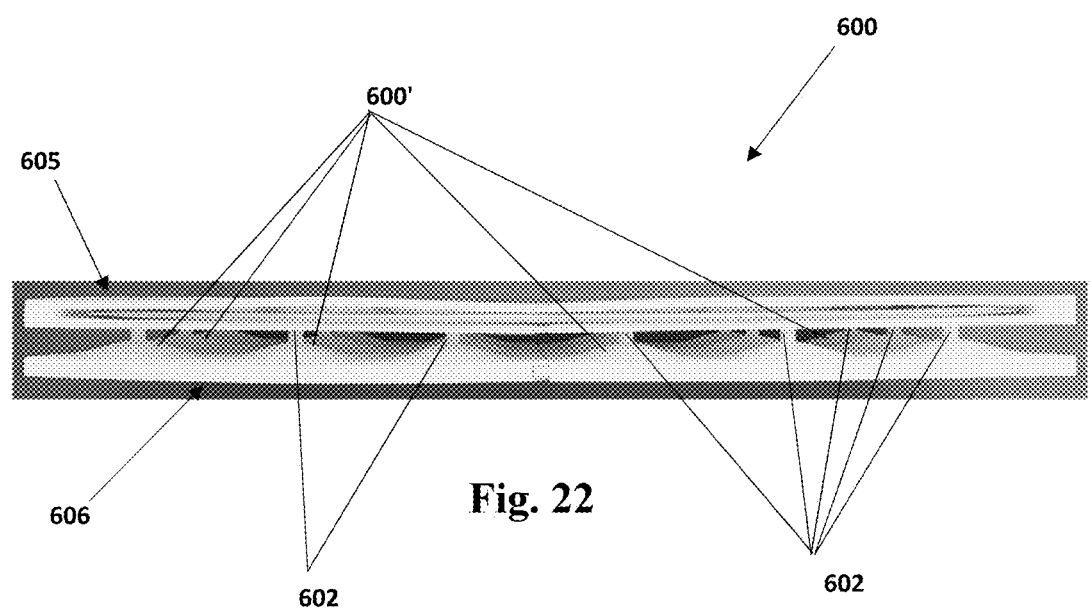
FIG. 22 is a side elevation of the NS shell array of FIG. 21.

Referring now to FIGS. 21 and 22, an array of NS energy dissipation device is indicated generally by the reference number 600. The array includes a plurality of individual NS shells 600', a first plate 605 and a second plate 606. The NS shells 600' are each formed as one piece of material with the first plate 605 and the second plate 606. However, it is to be understood that the NS shells 600' may be formed separately and attached to the first plate 605 and/or second plate 606. In this case, the second plate 606 is a base portion that performs the function of the sidewall 104 in the first embodiment to increase the force threshold of the shell 600' before the shell transitions from the first position (shown in FIGS. 21 and 22) to the second position (not shown but similar to what is illustrated in FIG. 2(c)), and exhibit negative stiffness as described above. In use, the first plate 605 would be outward facing for receiving an impact or load applied to the NS energy dissipation device 600. The NS shells 600' will resist the impact or load in parallel over the surface areas of the first plate 605. Each of the NS shells 600' include a vertical cylinder member 602 that connects the NS shell to the first plate 605 and transfers the force applied to the first plate to the center of the NS shell.

An energy dissipating device comprising a dome-shaped shell having a convex exterior surface and a perimeter extending in a closed loop around the shell, the shell being constructed to resist a load applied to the convex exterior surface of the shell up to a threshold, and to transition to a position in which the convex exterior surface become a concave exterior surface.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. An energy dissipation device for use in absorbing energy associated with an impact to provide protection for a structure, the energy dissipation device comprising a shell portion having a convex shape in a first configuration that defines an interior cavity, the shell portion having a perimeter edge extending in a closed loop around the periphery of the shell portion, and a base portion including a mounting edge connecting the perimeter edge of the shell portion to the base portion, the mounting edge extending in a closed loop around the shell portion and the perimeter edge of the shell portion is attached to the mounting edge along at least a majority of the closed loop of the mounting edge, the shell portion being configured for movement in response to a load being applied to an exterior of the shell portion from the first configuration to a second configuration in which the shell portion has a concave shape while continuing to absorb energy, and being configured to return to the first configuration from the second configuration upon removal of the load, the base portion being constructed to resist movement of the shell portion from the first configuration to the second configuration by resolving the load applied to the shell portion and transferred to the base portion at the connection of the perimeter edge base portion into a hoop stress resisted by the base portion, wherein the shell portion and base portion are constructed to exhibit negative stiffness behavior over at least a majority of a transition of the shell portion from the first configuration to the second configuration.

2. The energy dissipation device as set forth in claim 1 wherein at least three quarters of the perimeter edge of the shell portion is attached to the base portion.

3. The energy dissipation device as set forth in claim 1 wherein an entirety of the perimeter edge is attached to the base portion.

4. The energy dissipation device as set forth in claim 1 wherein the base portion comprises a cylindrical sidewall.

5. The energy dissipation device as set forth in claim 1 wherein the base portion comprises a block of material that also underlies the shell portion.

6. The energy dissipating device as set forth in claim 1 further comprising an input member attached to the shell portion on the exterior of the shell portion for transmitting force applied to the energy dissipating device to the shell portion.

7. The energy dissipating device as set forth in claim 1 wherein the shell portion comprises a first member and a second member, the first member having a different profile in cross section than the second member.

8. A compound energy dissipation systems comprising a plurality of energy dissipating devices as set forth in claim 1 connected in-series to increase the force threshold as well as the energy dissipation of the plurality of energy dissipating devices.

9. The compound energy dissipating structure as set forth in claim 8 wherein each of the energy dissipating devices has interconnection structure to attach the energy dissipating device to another energy dissipation device.

10. The energy dissipation device as set forth in claim 1 wherein the base portion has a shape that remains substantially constant as the shell portion moves from the first configuration to the second configuration.

11. A hybrid profile energy dissipating device comprising a shell portion having a convex shape in a first configuration that defines an interior cavity and a base portion, the shell portion including a first member and a second member, the first member having a different profile in cross section than the second member, the second member being connected to the base portion and the first member being connected to the second member to cooperatively form a dome-shaped member, the first member of the shell portion being configured for movement in response to a load at a first threshold being applied to an exterior of the shell portion from the first configuration to a second configuration in which the first member of the shell portion has a concave shape while continuing to absorb energy, and the second member of the shell portion being configured for movement in response to a load at a second threshold higher than the first threshold being applied to an exterior of the shell portion from the first configuration to a second configuration in which the second member of the shell portion also has a concave shape while continuing to absorb energy, whereby the energy dissipation device exhibits at least two peaks of force thresholds with large energy dissipation capability.

12. The hybrid profile energy dissipating device as set forth in claim 11 wherein the profile of the first member of the shell portion has a smaller radius of curvature than the radius of curvature of the profile of the second member of the shell portion.

13. The hybrid profile energy dissipating device as set forth in claim 12 wherein the first member of the shell portion is located in the center of the shell portion and the second member of the shell portion is located radially outwardly from the first member.

14. A hybrid profile energy dissipating device comprising a shell portion having a convex shape in a first configuration that defines an interior cavity, the shell portion including a first member and a second member, the first member having a different profile in cross section than the second member, the profile of the first member of the shell portion having a smaller radius of curvature than the radius of curvature of the profile of the second member of the shell portion, the first member of the shell portion being configured for movement in response to a load at a first threshold being applied to an exterior of the shell portion from the first configuration to a second configuration in which the first member of the shell portion has a concave shape while continuing to absorb energy, and the second member of the shell portion being configured for movement in response to a load at a second threshold higher than the first threshold being applied to an exterior of the shell portion from the first configuration to a second configuration in which the second member of the shell portion also has a concave shape while continuing to absorb energy, whereby the energy dissipation device exhibits at least two peaks of force thresholds with large energy dissipation capability.

15. The hybrid profile energy dissipating device as set forth in claim 14 wherein the first member of the shell portion is located in the center of the shell portion and the second member of the shell portion is located radially outwardly from the first member.

* * * * *